United States Patent [19]
Miotke et al.

[11] Patent Number: 5,089,759
[45] Date of Patent: Feb. 18, 1992

[54] ELECTRICAL MOTOR POSITION CONTROLLER

[75] Inventors: Mark D. Miotke, Richmond; Lawrence L. Chynoweth, Rochester Hills, both of Mich.

[73] Assignee: V.T.M. Industries, Inc., d/b/a Profiled Motion Division, Rochester Hills, Mich.

[21] Appl. No.: 631,799

[22] Filed: Dec. 21, 1990

[51] Int. Cl.$^5$ .............................................. G05B 19/42
[52] U.S. Cl. ............................ 318/568.11; 318/630; 318/599
[58] Field of Search ............... 318/778, 599, 811, 696, 318/754, 685, 630, 568.11, 739, 741

[56] References Cited

U.S. PATENT DOCUMENTS

| | | | |
|---|---|---|---|
| 4,682,091 | 6/1987 | Krewalk et al. | 318/685 |
| 4,739,240 | 4/1988 | MacMinn et al. | 318/696 |
| 4,851,749 | 6/1989 | Forrester | 318/630 |
| 4,962,976 | 10/1990 | Takahashi et al. | 318/811 |

Primary Examiner—William M. Shoop, Jr.
Assistant Examiner—John W. Cabeca
Attorney, Agent, or Firm—Basile and Hanlon

[57] ABSTRACT

A position controller controls the direction and degrees of rotation of an electrical motor output shaft in response to a stored control program. The stored control program contains a plurality of profiles, each including a plurality of successively executed steps defining the operation sequence of the motor. Each step includes programmed instructions defining a predetermined amount of rotation of the motor output shaft and a predetermined event which must occur before the step is executed. In one embodiment, the controller selectively controls the speed of the motor in each step. The controller supplies a signal, programmed in each step, to a variable frequency A.C. drive which correspondingly varies the frequency of A.C. power supplied to the motor to vary the operating speed of the motor.

17 Claims, 8 Drawing Sheets

ELECTRICAL MOTOR POSITION CONTROLLER

BACKGROUND OF THE INVENTION

1. Field of the Invention

This invention relates, in general, to electrical motors and, more specifically, to electrical motor controllers.

2. State of the Art

Electrical motors are widely used in manufacturing operations to control machines, automated equipment, etc. Suitable controls or controllers are used with such motors to selectively control the direction of rotation of the motor and the duration or amount of rotation of the motor. In certain instances, such controllers selectively control the speed of the motor as well as its acceleration and deceleration between start and end positions.

Variable frequency motor drives have been coupled to induction motors to selectively control the speed of such motors by varying the frequency of A.C. electrical power supplied to the motor. Such variable frequency motor drives are wired to supply different frequency A.C. power to the motor in response to selected input conditions, such as the depression of an input switch, an input signal from an external control unit, etc. The variable frequencies are selected in advance during the design of the variable frequency motor drive, motor and driven member or machine.

However, such "hard wiring" dedicates the variable frequency drive to the motor so as to provide only a limited number of different A.C. power frequencies and the resultant available motor speeds. Thus, it would be desirable to provide an electrical motor position controller in which the speed of the motor can be easily controlled in a re-programmable fashion so as to enable the speed of the motor to be selected from a multitude of different speeds and changed, as desired, due to varying application requirements, manufacturing conditions, etc.

Electrical controllers, such as programmable logic controllers (PLC) are widely used in manufacturing operations due to their easy re-programmability. Such programmable controllers operate a stored control program which defines the application program controlling the operation of an attached machine. Reprogramming through an operator interface or programming panel is easily accomplished when it is desired to modify the operation of the machine or device controlled by the programmable logic controller. However, such programmable logic controllers have limited programming capabilities and have not been widely applied to electric motor controls.

Thus, it would be desirable to provide an electrical motor controller which enables the direction and degree of rotation of an electric motor output shaft to be easily selected and varied. It would also be desirable to provide an electrical motor position controller in which a plurality of selectible motor operating sequences may be selected. It would also be desirable to provide an electrical motor position controller in which an electric motor is driven through a sequence of operation which is comprised of a plurality of discrete steps, each containing a plurality of programmable features, such as destination point, event and/or speed. Finally, it would be desirable to provide an electrical motor position controller in which the speed of the motor may be easily selected from a plurality of different available speeds to meet application requirements.

SUMMARY OF THE INVENTION

The present invention is an electrical motor position controller which selectively controls the direction of rotation, the amount (degrees) of rotation and, optionally, the speed of rotation of an electrical motor output shaft in accordance with a preprogrammed, stored control program with user definable parameters.

The electrical motor position controller of the present invention includes a first, bi-directional electrical motor having a rotatable output shaft. Pulse generator means are mounted on the first motor for generating a pulse train indicative of the degrees of rotation of the first motor output shaft. A first motor starter means is provided for supplying electric power to the first motor. Control means having a memory storing a control program is responsive to the pulse generator means for energizing the first motor starter means to supply electric power to the first electrical motor to rotate the output shaft of the first motor in a predetermined, programmed direction and for a predetermined number of degrees of rotation. The control means includes means for storing at least one profile defining a sequence of operation of the first motor, the one profile being formed of a plurality of discrete, sequentially executed steps. Each step is formed of preprogrammed instructions stored in memory which define a predetermined number of degrees of rotation of the first motor output shaft and an event which must take place before the particular step is executed. Preferably, a plurality of selectible profiles, each containing a plurality of discrete steps, are stored in memory and separately selected and executed.

In a preferred embodiment, the electrical motor position controller includes means for selectively varying the speed of the first motor between zero and a predetermined maximum speed. The speed varying means preferably comprises means for varying the frequency of the electrical power supplied to the first motor. The frequency varying means is preferably configured as a variable frequency A.C. motor drive which receives an analog signal from the control means selecting a predetermined speed for the first motor as programmed in each of the steps in the profile.

In another embodiment, first and second motors are coupled by a gear means or unit and selectively operated by the control means. The control means selectively controls the operation of each of the first and second motors via programmed destination, event and-/or speed, of the common output shaft of the first and second motors according to the preprogrammed profile.

The electrical motor position controller of the present invention overcomes many of the problems encountered in previously devised motor controllers in that it provides an easily reprogrammable control program for controlling the operation of a motor driven machine, member, etc. The electrical motor position controller may also be uniquely devised to vary the speed of the motor between zero and a maximum speed in any of the preprogrammed steps in a preprogrammed profile.

The unique control program executed by the control means of the present invention provides a plurality of different motor operating sequences, each containing a plurality of discrete program steps defining separate successive steps in the execution of each profile. Each step is defined by an event and a predetermined amount of rotation of the motor. Optionally, each step may also define the speed of rotation of the motor output shaft during each step. The occurrence of the event causes the motor to begin or continue motion to the next predetermined programmed amount of rotation.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
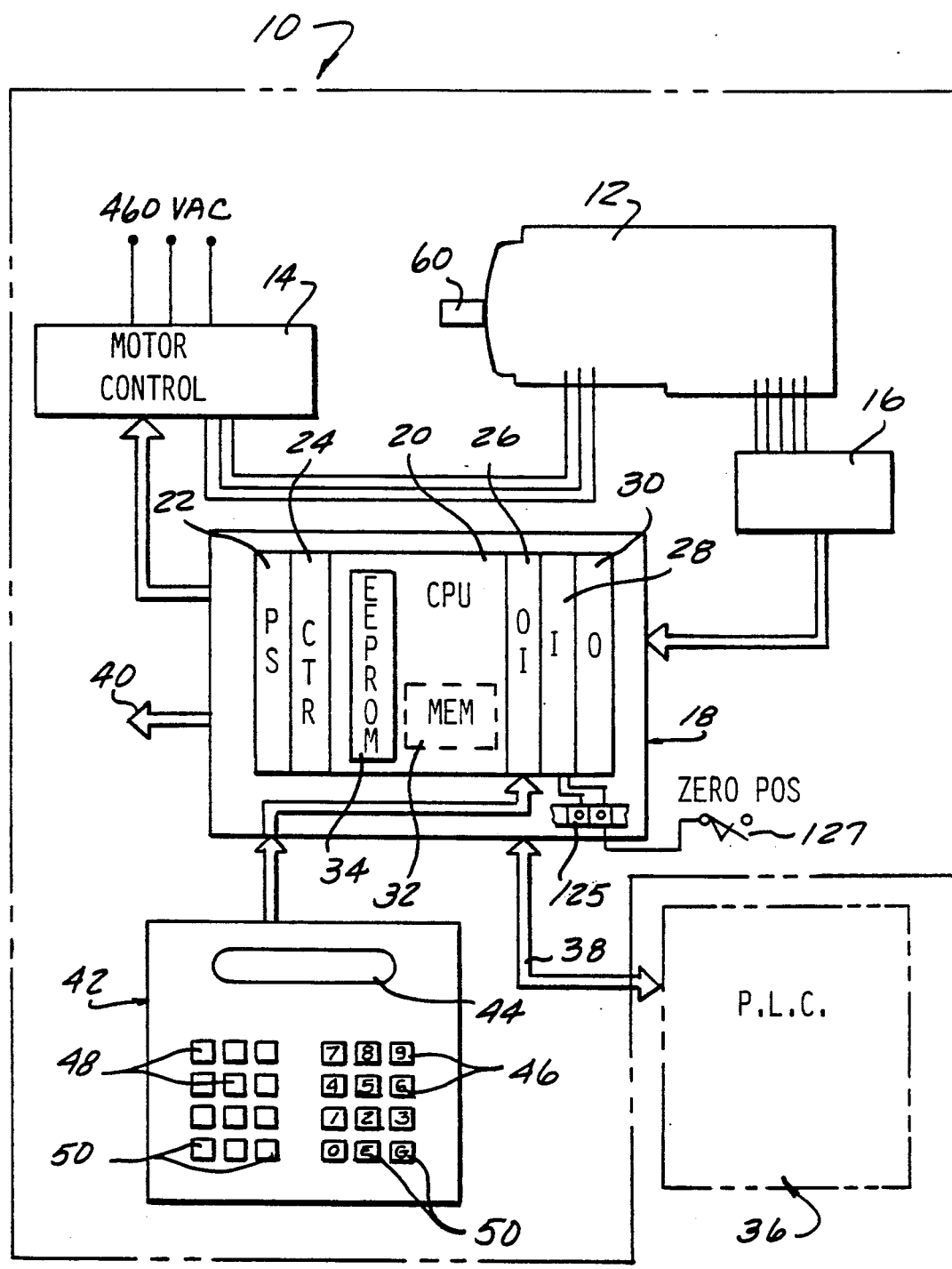
FIG. 1 is a block diagram of one embodiment of the electrical motor position controller of the present invention.

Referring now to the drawing, and to FIG. 1 in particular, there is depicted one embodiment of an electrical motor position controller 10 which precisely and re-programmably controls the position and sequence of operation of an electrical motor 12 in a predetermined sequence of operation. In the simplest configuration shown in FIG. 1, the electrical motor position controller 10 includes a first motor 12, a first motor control starter means 14, a pulse signal conditioner means or circuit 16 and a control means denoted generally by reference number 18.

The control means 18 may comprise any suitable electronic controller. Preferably, a programmable logic controller, such as the MINICONTROL (a trademark of B&R Industrial Automation Corporation, Stone Mountain, Ga., Model No. MCGE 33-0) may be employed. This controller contains a central processing unit 20, a power supply 22, a counter circuit 24, an operator interface circuit 26 and input and output circuits 28 and 30, respectively. All of these circuits or modules are mounted on conventional circuit boards which are plugged into a rack having back wiring to interconnect the various circuits in a conventionally known manner.

The power supply 22 receives a 24 VDC input voltage and has an internal battery backup. An internal capacitor provides a ten minute power supply to retain the memory in the central processing unit 20 when the internal battery is removed or is lacking sufficient power to operate the control means 18.

The central processing unit 20 controls the operation o the control means or controller 18 and executes an operation program stored in an internal memory 32. The operation program controls the execution and operation of the central processing unit 20 which generally examines inputs from the input circuits or modules 28 and activates selected outputs in the output circuit or module 30 according to a application program described hereafter. The first memory 32 is preferably an EPROM memory. The first memory 32 may also include a read/right RAM section for updating current input/output status.

A removably insertable second memory 34 is mountable in the central processing unit 20. The second memory 34 contains a RAM section and an EEPROM section. The second memory 34 stores the application program.

The EEPROM memory section of the second memory 34 is programmed with the application program to control the operation of the motor 12, as described hereafter. When the central processing unit 20 is powered up, this application program is downloaded into the read/right RAM memory section in the second memory means 34 and executed by the central processing unit 20 under the control of the operation program stored in the first memory 32.

The input module 28, such as one provided by B&R Industrial Automation Corporation, may contain a plurality of individual input circuits which are each connected to external devices, such as limit switches and push buttons, as well as to an external controller, such as a programmable logic controller (PLC) 36. The external controller 36 controls the overall machine operation and provides selected input signals via hard wired connections or a cable 38 to the control means 18. In a preferred embodiment, the input module 28 contains sixteen 24 VDC inputs which detect on/off switching or closures of push buttons, limit switches, etc.

Similarly, the output module 30, such as one provided by B&R Industrial Automation Corporation contains a plurality of separate outputs, such as twelve, which provide A.C. or D.C. switching as desired. The outputs are connected to various external devices, such as the first motor control starter mean 14, the external controller 36, and miscellaneous outputs 40 which control various devices on the associated machine.

It will be understood that additional input and output modules 28 and 30, respectively, may be employed in the control means 18. Furthermore, the input and output modules 28 and 30 may be provided in different configurations, such as a single module containing both input and output circuits as is conventional in programmable logic controllers.

The operator interface module 26 in the control means 18 receives signals from an operator interface 42 which may be mounted on the front of the control panel containing the control means 18 or internally within the control panel adjacent to the control means 18. In a preferred embodiment, the operator interface 42 contains a sixteen character LED display 44 for displaying various program information as described in greater detail hereafter. The operator interface 42 also includes ten numeric keys or push buttons 46, eight function push buttons or keys 48 and six display control keys or push buttons 50. The various keys or push buttons 46, 48 and 50 are employed to program the application program into the second memory 34 as well as to interrogate the control means 18 to determine its operation state, faults and general operating status.

The first motor 12 employed in the electrical motor position controller 10 of the present invention is any suitable electric motor. Preferably, the motor 12 comprises a bidirectional A.C. squirrel cage induction motor, such as one sold by Mannesmann Demag, Model No. KBA 225B 4.

Figure 2:
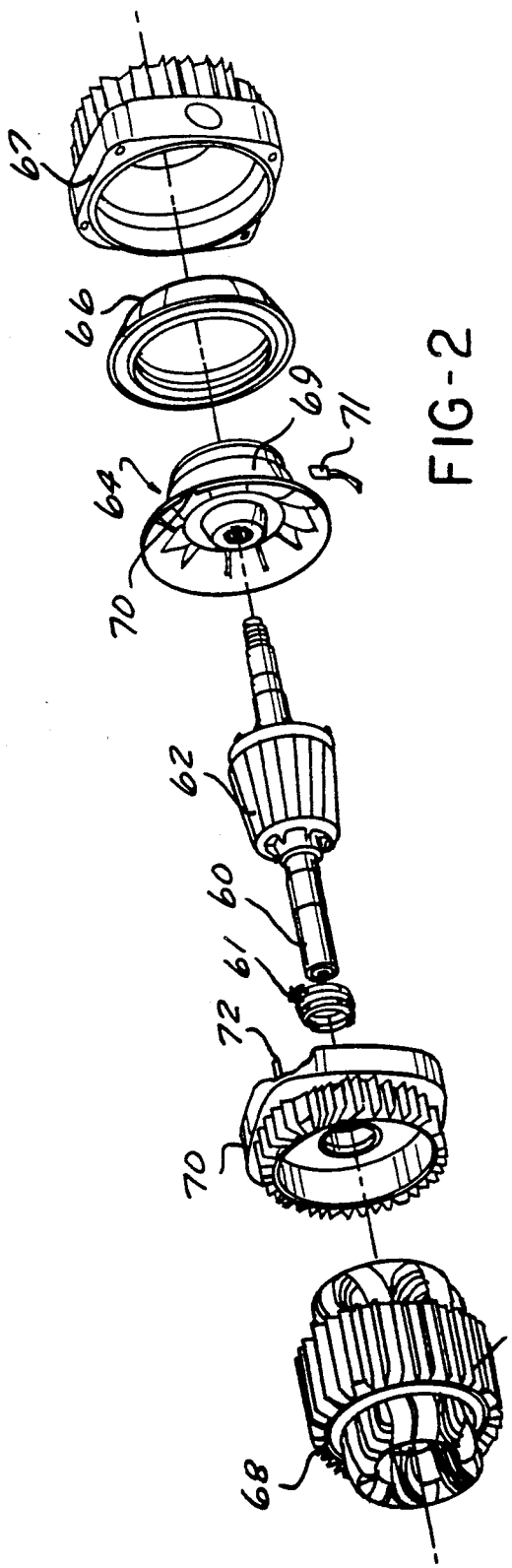
FIG. 2 is an exploded, partial, perspective view of the motor showing the marker notch of the pulse generator means.

As shown in FIG. 1 and in greater detail in FIG. 2, the first motor 12 includes a rotatable output shaft 60 which is formed on one end of a rotatable rotor 62. The rotor 62 carries a brake disc 64 which, in turn, has a conical brake ring 66 mounted externally thereon. The rotor 62 is spring biased by biasing means 61, such as a coil spring, so as to be axially movable with respect to a stationary brake seat 67. The rotor 62 is also rotatably mounted within a stator 68 stationarily positioned in the motor housing by a motor end shield 70.

In operation, energization of the motor such as by the application by current to the windings of the stator 68 will generate axial forces which will pull the rotor 62 into the stator and disengage the brake ring 66 from the brake seat 67 allowing the rotor 62 to freely rotate. When the current to the motor 12 is cut off, the biasing spring 61 will urge the rotor 62 in an opposite direction thereby bringing the brake ring 66 into contact with the brake seat 67 to brake the motor 12 to a complete stop.

Pulse generator means are mounted in the motor 12 for generating signals indicative of the degrees of rotation of the motor output shaft 60. The pulse generating means conventionally comprises an iron ring 69 mounted on the brake disc 64. The iron ring 69 is provided with thirty north poles and thirty south poles. A Hall effect pickup 71 is mounted in proximity with the iron ring 69 and generates two pulse trains labelled A and B, FIG. 3, which are used by the control means 18 to detect the direction of travel and the degrees of rotation of the motor output shaft 60. The signals A and B from the pulse generating means are square wave signals which are out of phase with respect to each other by 90°, as shown in FIG. 3.

In addition to the two signals A and B from the pulse generating means, the electrical motor position controller 10 of the present invention also includes means for generating a unique marker pulse which is used by the control means 18 to determine when the motor 12 is in its home or start position. The marker pulse is generated by forming a notch 70 in the peripheral edge of the brake disc 64 attached to the rotor 62. A sensing means 72, such as a proximity switch, is mounted in the motor end shield 70 and faces the peripheral edge of the brake disc 6 to detect the passage of the notch 70 therepast. The sensing means 72 generates an output signal, labelled "Z", which is carried by a conductor, not shown, to the pulse signal conditioner circuit 16 which is mounted on a circuit board 74 contained in a housing 76 attached to the exterior of the motor 12 as shown in FIG. 2.

Figure 3:
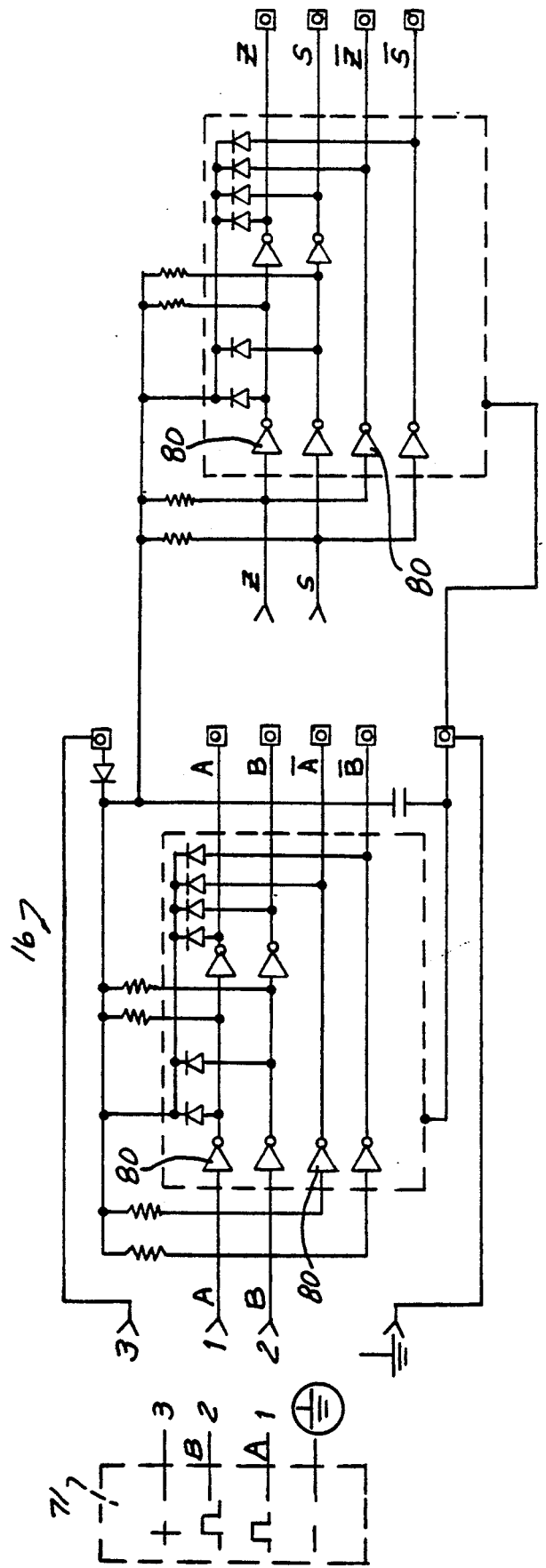
FIG. 3 is a detailed electrical schematic diagram of the pulse generator circuit shown in FIG. 1.

As shown in FIG. 3, the he signals A, B and Z are input through inverting amplifiers 80 in the pulse signal conditioner 16 to generate complimentary signals labelled $\overline{A}$, $\overline{B}$, and $\overline{Z}$.

The signals from the pulse signal conditioner circuit 16 are input to the counter module 24 in the control means 18. The counter module is a conventional counter circuit, sold by B&R Industrial Automation Corporation. The counter circuit 24 counts the pulses from the pulse signal conditioner means 16 and, due to the offset between the A and B signals, determines the direction of rotation of the output shaft 60 of the motor 12 so as to increase or decrease the total pulse count. The total pulse count is output to the central processing unit 20 for use in the control program described hereafter.

The control means 18 includes in its control application program means for defining a profile which defines the sequence of operation of the motor 12. A profile is formed of a plurality of discrete, sequentially executed steps. In a preferred embodiment of the present invention, the control means 18 is provided with eight profiles containing twenty-five discrete steps each or 200 steps to be allocated as desired between the eight profiles.

Figure 5:
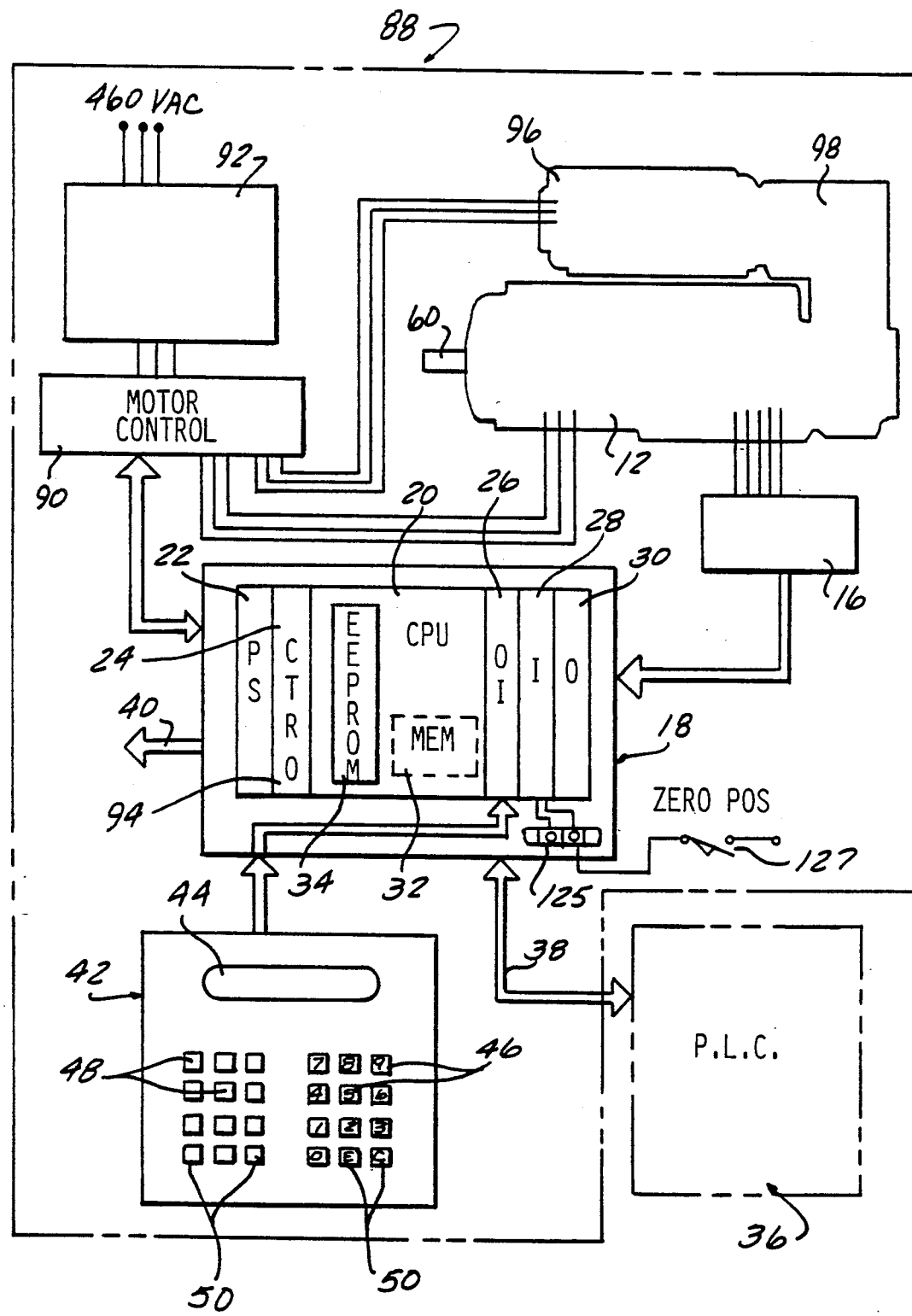
FIG. 5 is a block diagram of another embodiment of the electrical motor position controller of the present invention.

Each of the steps in each profile comprises a preprogrammed instruction which defines a destination and an event and, optionally in the embodiment shown in FIG. 5 and described hereafter, the speed of rotation of the output shaft 60 of the motor. Destination is defined as the predetermined pulse count that the output shaft 60 will be rotated to when the motor 12 is energized. The pulse count increases when the motor 12 output shaft 60 is rotating in a forward direction and decreases when the shaft 60 is rotating in a reverse direction. The rotation of the motor output shaft 60 is converted to pulses by the pulse generating means and the pulse signal conditioner circuit 16. The pulses are counted by the counter module 24 so that the pulse count is changed when the motor output shaft 60 is turning. Thus, as shown in the following Table No. 1, the destination in step 1 is a pulse count of 1386, that is, 1386 is the number of pulses with respect to a reference or start point at which the counter 24 was set to zero that the motor output shaft 60 will be rotated to when step 1 is executed. Step 1 is the first step to be executed and, also is the next step to be entered after the "Last Step" destination is reached.

The term "event" is defined as an instruction which tells the control means 18 what action takes place before advancing to the destination specified in a particular step. The control means 18 is provided with three different events which can be selectively programmed as user defined parameters. Such events include "destination", "input" and "time".

TABLE NO. 1

| SEQUENCE | 1 | | | | | | | | |
|---|---|---|---|---|---|---|---|---|---|
| STEP | 1 | 2 | 3 | 4 | 5 | 6 | 7 | 8 | 9...20 |
| LAST STEP | 0 | 0 | 0 | 1 | — | — | — | — | —... — |
| DEST. | 1386 | 1782 | 2970 | 3118 | — | — | — | — | —... — |
| EVENT | INP | DEST | DEST | DEST | — | — | — | — | —... — |
| ANALOG OUT | 100 | 50 | 100 | 10 | — | — | — | — | —... — |

In the example shown in Table No. 1, the event in step 1 is an input, "INP", which means that the control means 18 will not advance to the destination, i.e., pulse count 1386, until an input is received from an external source. This input can be a hard contact, such as a limit switch, push button, etc., or an external signal from the external controller 36. When the input signal is received, the control means 18 will execute step 1 and energize the motor so that the output shaft rotates a corresponding number of degrees equal to a pulse count of 1386. Upon reaching the specified pulse count, the control means 18 will execute the next step in the profile.

If the programmed event is a "destination", the control means 18 will automatically execute the next programmed step when the pulse count specified in the preceding step is reached. This is shown in steps 2, 3 and 4 in Table No. 1.

A "time" event is executed by the control means 18 by starting a time period upon entering a step. The control means 18 will remain in a particular step with the motor 12 de-energized until the time period has elapsed. The control means 18 then energizes the motor 12 and drives the motor output shaft 60 until the pulse count programmed in that particular step is reached.

Figure 4:
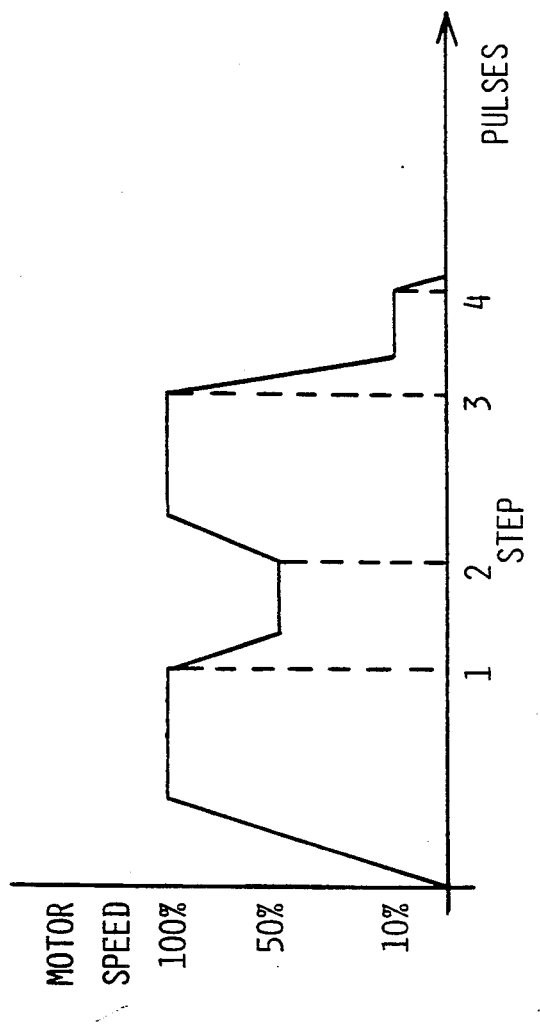
FIG. 4 is a graph depicting an exemplary motor operation profile containing a plurality of discrete steps.

Speed may also be a programmed instruction in each step, as shown in Table No. 1. When the motor 12 is energized, the control means 18 through a variable frequency drive 92, FIG. 5, described hereafter, selectively controls the speed of the motor 12 between 0% and 100% of rated speed as described in detail hereafter. Thus, steps 1 and 3 show the motor 12 being operated at 100% of rated speed; while step 2 shows the motor 12 as being operated at 50% of rated speed. Step 4 shows a slower speed of 10% of rated speed. The profile depicted in Table No. 1 is illustrated in FIG. 4 as a function of pulses and motor speed. Although not shown in FIG. 4, upon completion of last step in the profile an additional step could be programmed into the memory of the control means 18 to return the motor 12 and attached device to a start or reference position at any particular speed, such as a high speed equal to 100% of maximum speed.

A second embodiment of an electrical motor position controller 88 of the present invention is shown in FIG. 5. In this embodiment, the control means 18, operator interface 42, pulse signal conditioner circuit 16 and the first motor 12 are identical to that described above and shown in FIG. 1. In this embodiment, the position controller 88 is provided with means for selectively varying the speed of the first motor 12. Preferably, the speed Varying means comprises a variable frequency motor drive 92, such as a Mitsubishi VVVF Transistor Inverter FREQROL-$Z_{200}$-UL or a VEEARC SUPER 7000 manufactured by Vee-Arc Corporation of Milford, Mass. Each of these variable frequency drives varies the frequency of the A.C. power applied to a motor by pulse width modulating the A.C. power signal. This frequency can be varied between zero and a predetermined maximum, such as 120 Hz, in response to an input signal selecting a predetermined frequency. The selected frequency can be a variable analog signal generated by the control means 18 through an output 94 on the counter module 24. For example, the analog signal could vary between 0 and +10 VDC, with 10 VDC equalling 100% of rated speed at 120 Hz. A smaller analog signal, such as +5 VDC, input to the variable frequency drive means 92 will cause the frequency of the A.C. power supply to the first motor 12 to be reduced by 50% or to 60 Hz. This will reduce the speed of rotation of the output shaft 60 of the first motor by 50% of rated speed.

The generation of the analog signal 94 is under the control of the control program in the control means 18 and will be described in greater detail hereafter.

In addition to controlling the speed of the first motor 12, the control means 18 via suitable signals to the motor control or starter circuit 90 and the variable frequency drive means 92 also controls the direction of rotation of the output shaft 60 of the motor. Basically, two signals are provided by the control means defining a motor forward or motor reverse direction of rotation. The variable frequency drive means 92 thus reverses the polarity of the A.C. power supplied to the motor 12 to provide either forward or reverse direction of rotation of the motor output shaft 60.

FIG. 5 also depicts another embodiment of the present invention where a second motor 96 is operated in conjunction with the, first motor 12. The second motor 96 preferably comprise a micromotor. The output shaft, not shown, of the second motor 96 is coupled to the rotor 62 and output shaft 60 of the first motor 12 via a gear means shown generally by reference number 98. In a preferred embodiment, the gear means 98 comprises a gear reduction means for reducing the rotational speed of the second motor 96 when it is coupled to the rotor 62 and the output shaft 60 of the first motor 12. By way of example only, the first and second motors 12 and 96 and the gear means 98 may comprise a conventional feed package constructed of components sold by Mannesmann Demag (first motor 12 is Model No. KBA 90B 4, the second motor 96 is Model No. KBA 71B 4 and the gear means 98 is sold as Model No. FG06).

As described above, the rotor 62 of the first motor 12 is slidably mounted and moves in a direction away from the gear means 98 when electrical power is supplied to the windings of the first motor 12. This movement acts as a clutch and decouples the second motor 96 from the first motor 12 and enables the first motor 12 to solely rotate the output shaft 60. However, when the first motor 12 is de-energized, as described hereafter, the rotor 62 will shift to the right in the orientation shown in FIGS. 3 and 5 thereby coupling the rotor 62 with the gear reduction means 98 and the output shaft of the second motor 96. Rotation of the output shaft 60 is then controlled by the second motor 96 under program control of the control means 18.

The use of the second motor 96 provides fine control and/or braking of the output shaft 60. Generally, the first motor 12, for example, can be used to rotate the output shaft 60 at high speed, with the second motor 96 being utilized when the first motor 12 is de-energized to rotate the output shaft 60 at a lower, predetermined speed.

Figure 6A:
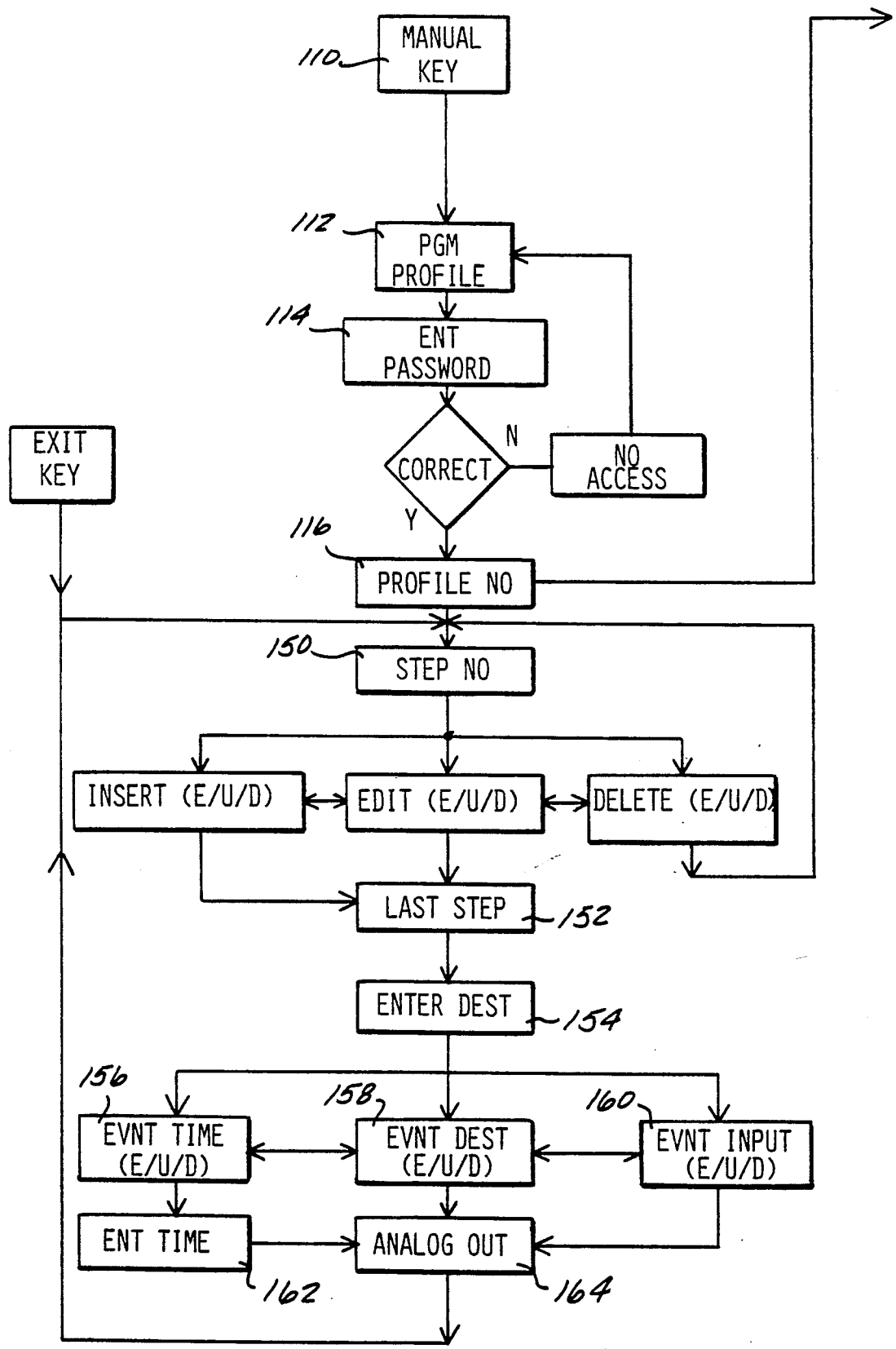
FIGS. 6A and 6B, respectively, are flow charts of the operation of the program profiles menu and the setup menu of the control program of the present invention.
Figure 6B:
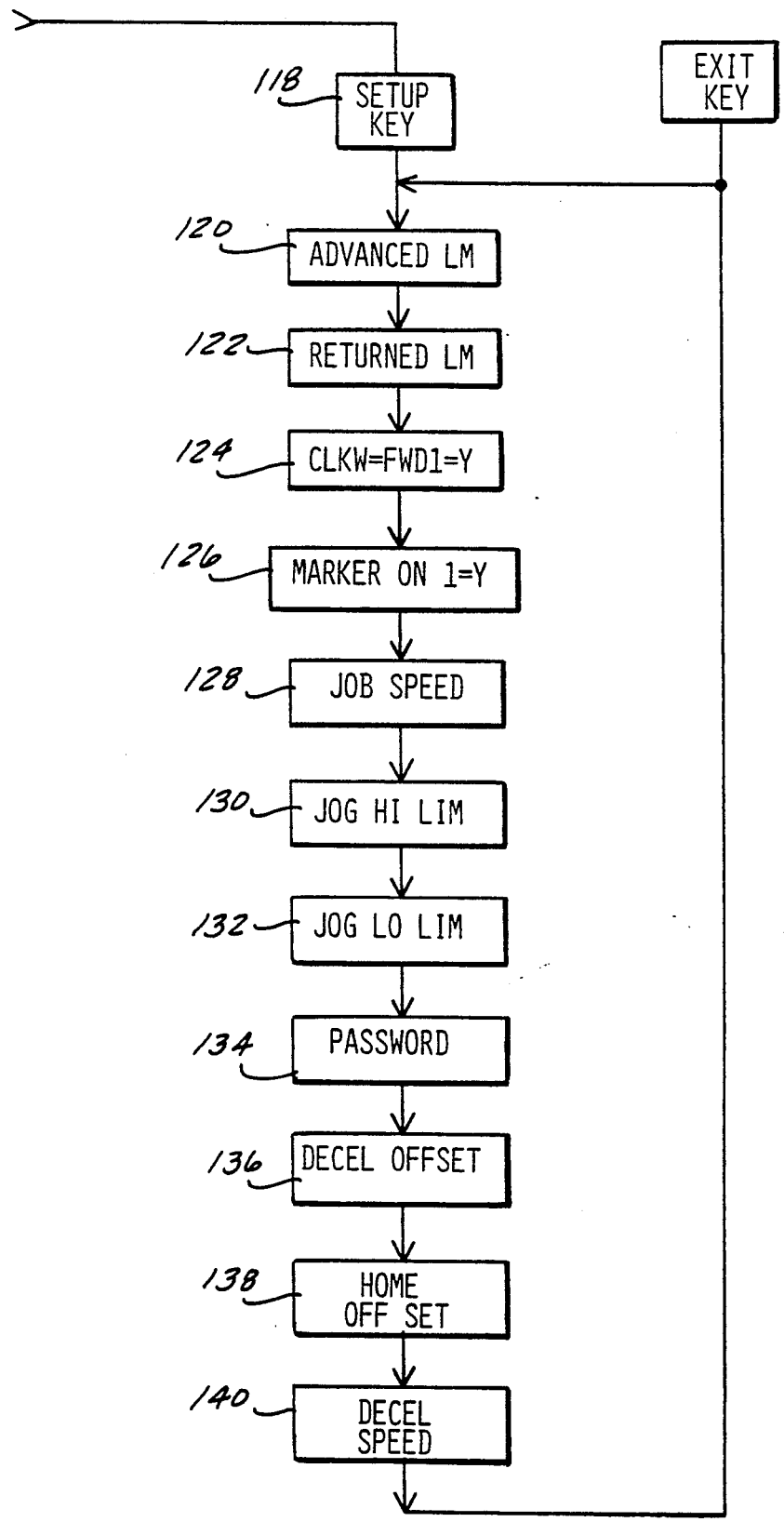

Referring now to FIGS. 6A and 6B, there is depicted a flow chart of the program profile menu and setup menu, respectively, of the application program stored in the memory 34 of the control means 18. These menus utilize the function keys 48 on the operator interface 42 to enter manual, setup, program profiles modes as well as to implement up, down, enter, exit and cancel functions.

The difference between the program profile menu shown in FIG. 6A and the setup menu shown in FIG. 6B is that the parameters entered in the setup menu effect the whole system, whereas the parameters entered in the program profile menu effect only a particular step in a profile.

In order to enter the setup menu, the manual key 48 must first be depressed, step 110 in FIG. 6A. This places the application program in manual mode. The program profile key or push button 48 on the operator interface 42 is then depressed, step 112, and the password entered in step 114. The password provides selective control to the application program as the setup and program profile menus effect parameters controlling the operation of the control means 18. When the correct password has been entered, the profile number is entered in step 116 or the setup key or push button 48 on the operator interface 42 can be depressed in step 118, FIG. 6B. This activates the setup menu and enables the operator to program various limits and functions as described hereafter.

Each of the functions will be prompted by the control means 18 which will display the appropriate command on the display 44 in the operator interface 42. The operator then enters the appropriate numbers, such as a predetermined pulse count, followed by the "(E)nter" key 48 on the operator interface 42 to load the limit or function into the memory 34 of the control means 18.

The various functions or limits programmed in the setup menu are described in sequence hereafter. The advanced limit, step 120, is a software "high" limit which indicates the advanced position of the output shaft 60 of the motor 12 and the device attached thereto. This limit indicates that the attached device is in its advanced or forwardmost position. The next step 122 is the programming of the return limit which is similar to the advance limit except that it is a software "low" limit. Whenever the present pulse count from the counter falls below this limit, the returned OUTPUT, not shown, from the control means 18 turns on indicating that the device has been "returned".

In step 124, the rotational direction of the motor output shaft 60 is selected. A clockwise direction is typically programmed as being equivalent to forward movement of the device attached to the output shaft 60 of the motor 12. Next, the control unit 18 will issue a "marker pulse" prompt on the display 44 in the operator interface 42. The marker pulse is the signal "Z" generated by the sensing means 72 on the motor 12. The sensing means or proximity switch 72, as described above, looks for the notch 70 in the brake disc 64 of the motor 12 and generates an output pulse when the notch 70 passes the sensing means or switch 72. The marker pulse will be generated once every revolution of the output shaft 60 of the motor 12 and is used to increase referencing accuracy. To reference the control means 18, the GOTO HOME POS input, 125, FIG. 5, i.e. a push button, is held "high". This causes the motor 12 to rotate the output shaft 60 in a reverse direction until the control means 18 sees the rising edge from the ZERO POSITION (ZERO POS) input, 127, which is preferably a limit switch. When the rising edge is detected, the motor 12 will then be energized to move in a forward direction until it sees the falling edge of the ZERO POSITION input 127. Then, one of two things will happen depending upon what value was entered for the marker pulse prompt. If a "0" is entered for the marker pulse prompt, then, when the falling edge occurs, this edge will be considered the reference point or "home" point, and will be used as a basis for counting pulses from the pulse generating means.

If a "1" is entered for the marker pulse prompt, then the motor 12 will continue to rotate the output shaft 60 in a forward direction until the next marker pulse is seen at which time the motor 12 is de-energized and rotation of the shaft 60 stopped. This point will then be considered the reference point instead of the falling edge of the ZERO POSITION input 127.

The next step 128 in the setup menu is the selection of jog speed which is the speed that the motor 12 will be energized to sequence the motor 12 through a particular profile. The jog speed is similar to the analog output 94 and is preferably selected to cause a low rotational speed, such as 10% of full rated speed, of the motor 12. The jog high limits and jog low limits in steps 130 and 132 are then successively entered to set the maximum and minimum amounts of travel or rotation of the motor 12. These limits are similar to the advanced and return limits set is steps 120 and 122 and described above.

The new password can then entered in step 134. The next prompt in step 136 on the display 44 is a "deceleration offset". The deceleration offset is a value which is manipulated by the control means to gain positioning accuracy by dropping down to a lower speed (deceleration speed) when approaching either the advanced or return limit position set in steps 120 and 122. When the deceleration offset is reached, the control means 18 drops the rotational speed of the output shaft 60 of the motor 12 to a lower speed set by a deceleration speed value in step 140, as described hereafter.

The home offset prompt in step 138 requires a value which is loaded into the pulse counter 24 upon referencing the application program. This enables the control means 18 to count in a negative direction with respect to the reference point. Finally, the deceleration speed, i.e. 50%, etc., is set in step 140. It should be noted that the deceleration speed set in step 140 results in a substantially linear speed deceleration as shown in FIG. 4.

The program profile menu shown in FIG. 6A enables the operator or user to program each profile and the steps within each profile. After selecting a particular step number in step 156, the user may either insert, edit or delete the number as desired. The last step number in a particular profile is entered in step 154 if the step being programmed is the last one in a particular profile. In response to a prompt on the display 44, the user then enters the destination in step 156. Next, the event in the particular step is programmed as shown by steps 156, 158 and 160. These events can either be a time, destination or input as described above. If a time event is selected, the user enters the amount of time in step 162. The analog output in step 164 is then programmed to specify a particular motor speed in the step, as described above.

The automatic operation of the control means in executing its application program will now be described with reference to the flow chart shown in FIGS. 7A and 7B. Automatic mode is entered by depressing the automatic mode key 48 on the operator interface 42 as shown in step 170. Automatic mode is the only time that the control means 18 will enable electric power to be applied to the motor 12 allowing the motor 12 to rotate the output shaft 60. The control program in the control means 18 first checks to insure that the motor 12 has located the zero point or ZERO POS. If the zero point is not located in step 172, the control means will energize the motor 12 to locate the zero point. The control means 18 sends a output to the motor 12 to rotate the output shaft 60 in a reverse direction at the deceleration speed set in the setup menu. The output shaft 60 of the motor 12 will keep turning in the reverse direction until another input is received from the ZERO POS input which is connected to a reference limit switch 127 on the machine operated by the motor 12. When the control means 12 sees the rising edge of the ZERO POS input 127, step 178, it turns off the motor reverse output and turns on the motor forward output. This stops the motor 12 from turning in the reverse direction and starts the motor 12 turning in the forward direction in step 180. The motor 12 drives the attached device off of the ZERO POS limit switch 127 such that the home position input falls to a low logic state. The control means is now "referenced" as indicated in step 182 and is ready to execute a preprogrammed sequence or profile.

Next, the profile number is selected. In a preferred embodiment, a three-digit binary coded decimal (BCD) signal from an external logic controller 36 on data lines 38 is input to the control means 18 selecting one of the eight profiles provided in the exemplary version of the present invention. This occurs in step 184. If the read-/interrupt input is at a high logic level in step 186, the control means 18 reads the profile number inputs from the external controller 36 and echoes the received profile number back to the external controller 36 for verification in step 188. The profile is then selected in step 190 and the control means 18 enters a ready state, step 192, awaiting the event specified in step 1 of the selected profile in step 194. At this time, the control means 18 may activate or energize any enabled miscellaneous outputs 40 which are used to control various devices attached to the associated machine.

The control means 18 checks to determine that the specified event, such as a time, input, or destination, has occurred in step 196. When the programmed event has occurred, the control means 18 executes step 1 in the selected profile, step 198, by energizing the motor 12 to rotate the output shaft 60 in the specified direction to the destination specified in the first step. The control means 18 also disables the miscellaneous outputs 40. If the emergency stop input goes high for any reason, as shown in step 200, indicating that the emergency stop push button has been depressed, the control means 18 immediately stops the motor 12, step 202 and returns to the beginning of the program awaiting the selection of a new profile number.

Figure 7B:
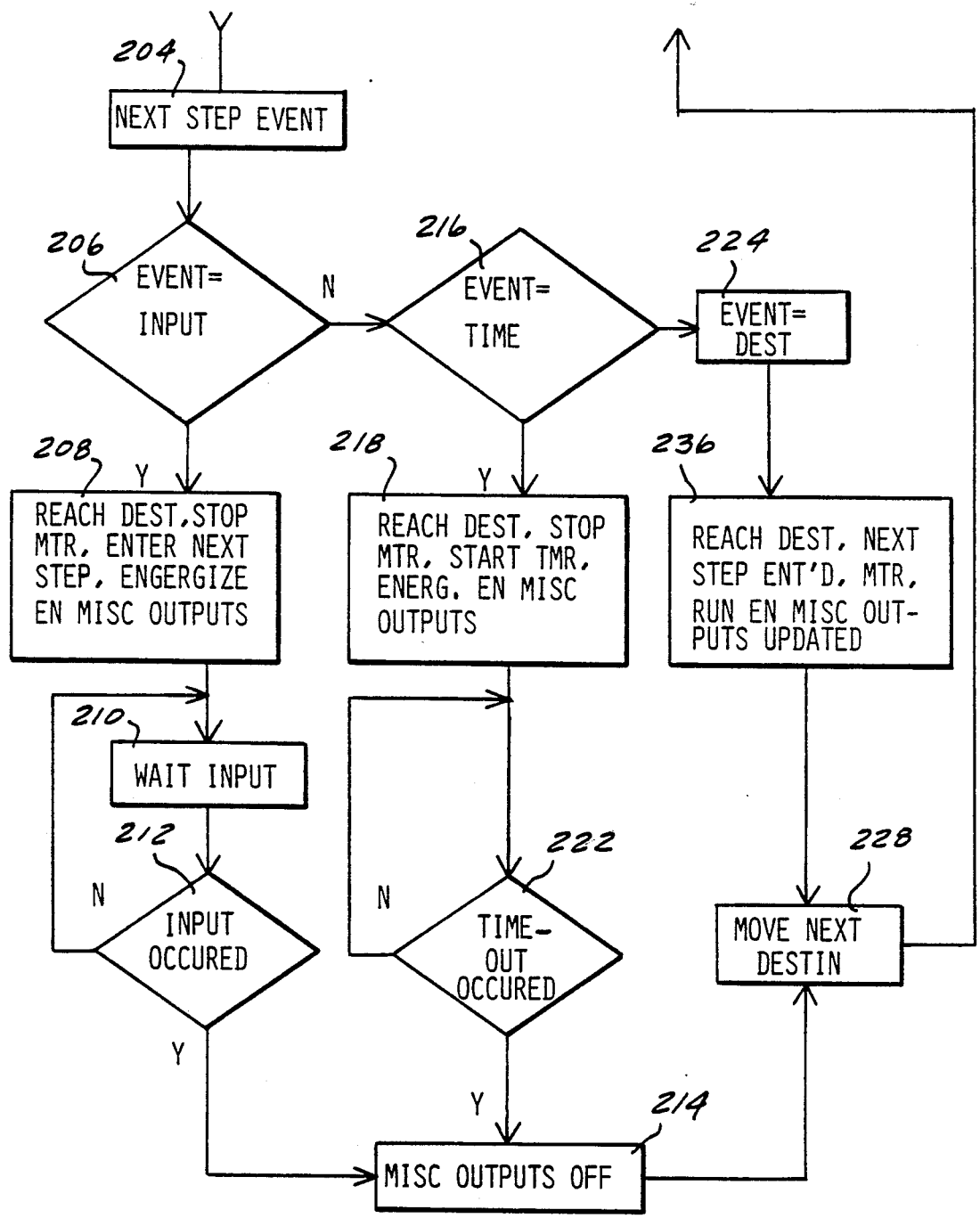
FIGS. 7A and 7B are a flow chart of the automatic operation of the control program executed by the control means of the present invention.

Assuming that no emergency stop condition has occurred, the control means 18 will then await the occurrence of the event programmed in the next step when the destination has been reached, as shown in step 204 in FIG. 7B.

The control means 18 checks to determine if the programmed event is an input in step 206. If the programmed event in the next step is an input, the control means 18 will stop the motor 12 when the current step's programmed destination is reached, and enable selected miscellaneous outputs in step 208. The control means 18 then awaits for the specified input to occur in step 210. When such event has occurred, step 212, the miscellaneous outputs are turned off in step 214 and the motor 12 is energized to move to the step's destination. Once that destination is reached, control passes to the next step in the selected profile.

If the programmed event in a particular step is a time event, step 216, the control means 18 will start the timer in step 218 when the destination is reached and stop the motor 12. Enabled miscellaneous outputs 40 are energized during timing. The control means 18 waits for the specified time period to elapse in step 222. When the timeout has occurred, the control means 18 turns off the miscellaneous outputs and energizes the motor 12 to move to the step's destination. Once that destination is reached, the next step is entered and executed.

If the programmed event in a particular step is a destination, step 224, the control means 18 will maintain the motor 12 in an energized state and continue to the next destination. The miscellaneous outputs are updated in step 226 when the previous specified destination is reached and the control means 18 immediately moves into the next step and causes the motor 12 to continue to the next step's destination, as shown by reference number 228. The motor 12 will run at the speed programmed in the step is this option is utilized. Thus, optionally, the destination event may be used for speed changes.

Figure 7A:
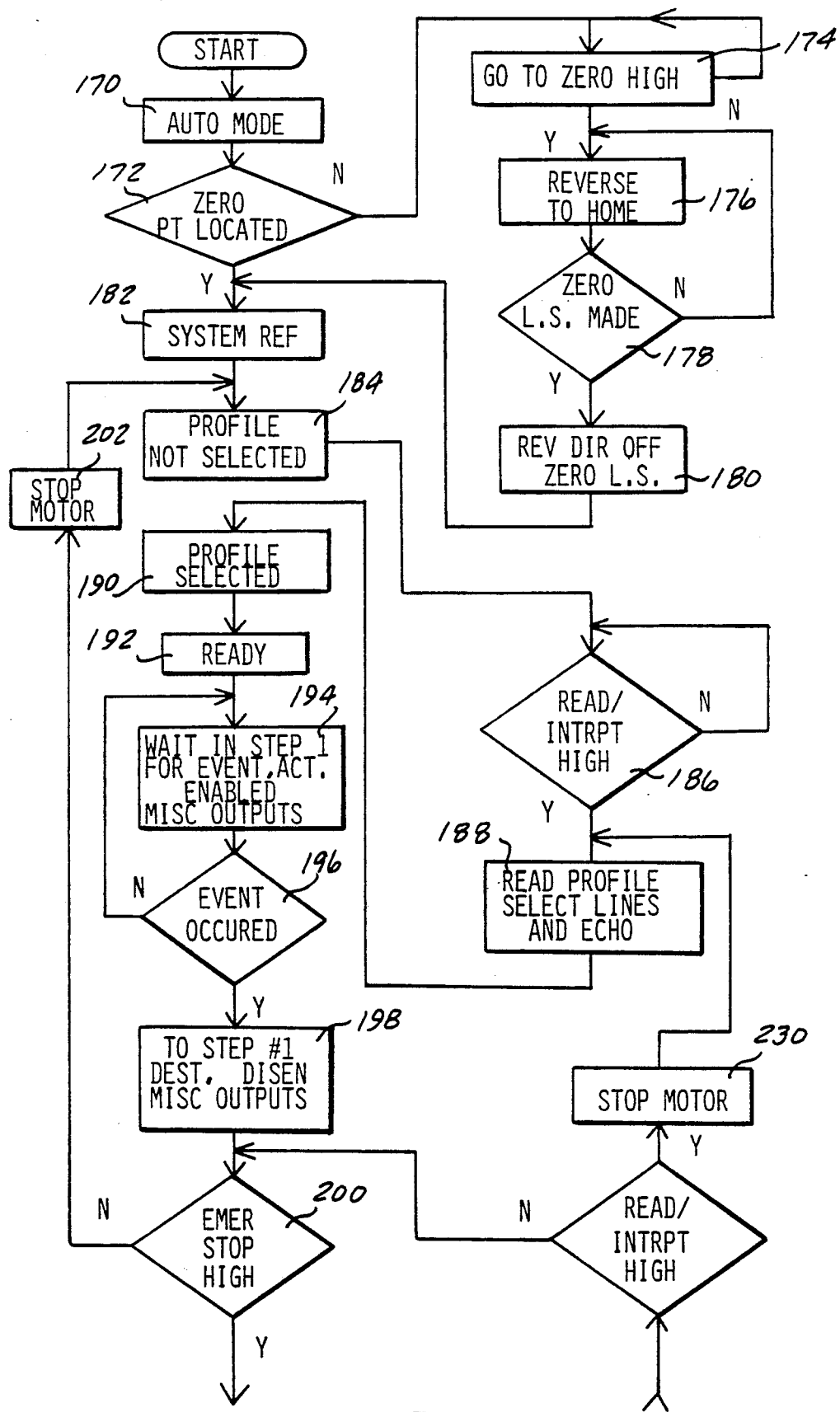

If the read/interrupt input goes high at any time, the control means 18 will stop the motor 12, step 230, and read a new profile number from the external controller 36, as shown in FIG. 7A.

While executing all of the steps in a particular selected profile, the control means 18 is also awaiting the possible selection of a new profile via an input signal from the external controller 36. The above-described sequence will be repeated for the new profile if selected; otherwise the same profile is executed continuously, going from step 1 to the last step, step 1 being reentered when the last step's destination is reached.

It will be understood that various modifications may be made to the operation program to meet the needs of a particular application. Various outputs may be energized in various steps depending upon the particular application.

Furthermore, while the above description indicates that the control means 18 can control a single motor or a pair of motors coupled by an interconnecting gear unit, the control means 18 may also be employed to control two separate motors, with control of each motor being specified by separate steps in the application program stored in the memory 34 of the control means 18.

The application program can also be programmed to generate various error or fault diagnostic messages which are displayed on display 44. The messages, for example, can designate "no pulses", "home not reset", "emergency stop", and the like.

As shown in FIG. 4, the application of electric power to the motor and the de-energization of the motor or a slowing of the motor to a substantially lower operating speed results in a substantially linear acceleration and deceleration of the motor output shaft, in accordance with the motor's operating characteristics. This substantially linear acceleration and deceleration can potentially cause damage to the parts or workpieces being controlled, transported or worked on by the machine driven by the motor controlled by the electrical motor position controller of the present invention as well as increasing mechanical wear on the machine driven by the motor. Overshoot of preprogrammed destinations and the resultant loss of precise positioning accuracy may also result.

To overcome these problems, the electrical motor position controller of the present invention may include means for gradually accelerating and decelerating the motor output shaft in a programmed manner. Such means is dependent upon the number of pulses programmed in a particular step and the programmed speed of rotation of the motor output shaft. The control means 18, according to instructions stored in the memory 34, during each scan of the central processing unit 20, i.e., ten milliseconds, gradually increases the speed of the motor to the programmed speed as the motor rotates from a start or beginning position. This avoids the abrupt "jerk" when full power is applied to the motor to cause the motor output shaft to rotate at a predetermined speed, such as 100% of rated speed.

A similar smooth deceleration may be implemented by the control means 18 in which the control means 18 will determine the pulse count associated with a particular destination and energize the motor at the programmed speed for a predetermined number of the programmed maximum pulse count. When this number is exceeded, the control means 18 will gradually decrease the speed of the motor, i.e., by supplying appropriate signals to vary the frequency of the A.C. power supply to the motor, as described above, until the destination or programmed pulse count is reached. It should be noted that the smooth acceleration and deceleration described above is most advantageously employed for high pulse count rotations and large changes in the speed of the motor, i.e., zero to 100%, 100% to 50%, etc.

What is claimed is:

1. An electrical motor position controller comprising:
   a first bidirectional electric motor having a rotatable output shaft;
   pulse generator means, mounted on the first motor, for generating a series of pulses indicative of the degrees of rotation of the first motor output shaft;
   first motor starter means for supplying electrical power to the first motor; and
   control means, having a memory storing a control program and responsive to the pulse generator means and the control program, for energizing the first motor starter means to supply electrical power to the first motor to rotate the output shaft of the first motor in a predetermined programmed direction and for a predetermined programmed number of degrees of rotation, the control means including:
   means for storing at least one profile defining a sequence of operation of the first motor, the at least one profile being formed of a plurality of discrete, sequentially executed program steps; and
   each step formed of programmed instructions specifying a predetermined number of degrees of rotation of the first motor output shaft and an event to take place before each step is executed.

2. The electrical motor position controller of claim 1 wherein the control means further includes:
   means for storing a plurality of selectible profiles, each including a plurality of discrete steps.

3. The electrical motor position controller of claim 1 wherein the first motor is an A.C. electric motor.

4. The electrical motor position controller of claim 3 further including:
   means, responsive to the control means, for activating the first motor starter means for selectively varying the speed of the first motor between zero and a maximum speed.

5. The electrical motor position controller of claim 4 wherein the speed varying means comprises:
   means for varying the frequency of the electrical A.C. power applied to the first motor.

6. The electrical motor position controller of claim 5 wherein the frequency varying means supplies pulse width modulated A.C. electrical power to the first motor.

7. The electrical motor position controller of claim 1 wherein:
   the first motor includes a rotor, a rotor brake disk and a stator; and further including:
   a notch formed on a peripheral edge of the rotor brake disc;
   means, mounted in the first motor, for sensing the passage of the notch therepast as the rotor rotates, the sensing means generating an output signal for each passage of the notch therepast; and
   the control means being responsive to the output signal from the sensing means for locating the home position of the first motor.

8. The electrical motor position controller of claim 4 wherein:
   each step includes programmed instructions specifying a speed of rotation of the first motor output shaft during the execution of a particular step; and
   the control means is responsive to the programmed speed instructions in each step for controlling the speed varying means to vary the speed of the motor in accordance with the programmed speed instructions in each step.

9. The electrical motor position controller of claim 8 wherein the control means further comprises:
   means for calculating the difference between the current degree of rotation of the motor output shaft during the execution of each step and the total amount of actual rotation of the motor output shaft in that step;
   means for determining the difference between the current speed of rotation of the motor output shaft and the programmed speed of rotation of the motor output shaft in a step; and
   means responsive to both differences for gradually accelerating the motor output shaft from a beginning speed of rotation in a step to the programmed speed of rotation in a step and decelerating the speed of rotation of the motor output shaft from its current speed to the programmed speed in a particular step in a gradual manner dependent upon the differences between the actual and programmed degrees of rotation of the motor output shaft and the actual and programmed speed of rotation of the motor output shaft in each step.

10. An electrical motor position controller comprising:
   a first bidirectional electric motor having a rotatable output shaft;
   pulse generator means, mounted on the first motor, for generating a series of pulses indicative of the degrees of rotation of the first motor output shaft;
   first motor starter means for supplying electrical power to the first motor; and
   a second bidirectional electrical motor having a second rotatable output shaft;
   gear means for coupling the second output shaft of the second motor to the first output shaft of the first motor;
   second motor starter means for supplying electrical power to the second motor;
   control means, having a memory storing a control program and responsive to the pulse generator means and the control program, for energizing the first motor starter means to supply electrical power to the first motor to rotate the output shaft of the first motor in a predetermined programmed direction and for a predetermined programmed number of degrees of rotation and for selectively energizing and de-energizing the second motor, the control means including:
   means for storing at least one profile defining a sequence of operation of the first motor, the one profile being formed of a plurality of discrete, sequentially executed program steps; and each step formed of programmed instructions specifying a predetermined number of degrees of rotation of the first motor output shaft and an event to take place before the step is executed.

11. The electrical motor position controller of claim 10 wherein:

the first and second motors are A.C. electric motors.

12. The electrical motor position controller of claim 11 further including:

means, responsive to the first motor starter means and the control means, for selectively varying the speed of the first motor between zero and a maximum speed.

13. The electrical motor position controller of claim 12 wherein the speed varying means comprises:

means for varying the frequency of the electrical power applied to the first motor.

14. The electrical motor position controller of claim 13 wherein the frequency varying means supplies a pulse width modulated A.C. electrical power to the first motor.

15. The electrical motor position controller of claim 10 wherein:

the gear means comprises gear reduction means.

16. An electrical motor position controller comprising:

a first bidirectional A.C. electric motor having a rotatable shaft;

pulse generator means, mounted on the first motor, for generating a series of pulses indicative of the degrees of rotation of the first motor output shaft;

first motor starter means for supplying electrical power to the first motor;

means for varying the frequency of the A.C. electric power supplied to the first motor so as to vary the speed of rotation of the first motor output shaft; and control means, having a memory storing a control program and responsive to the pulse genera means and the central program for energizing the first motor starter means to supply electrical power to the first motor to rotate the output shaft of the first motor in a predetermined programmed direction and for a predetermined programmed number of degrees of rotation, the control means including:

means for storing a plurality of profiles each defining a sequence of operation of the first motor, each profile being formed of a plurality of discrete, sequentially executed program steps; and each step formed of programmed instructions specifying a predetermined number of degrees of rotation of the first motor output shaft, an event to take place before each step is executed, and a speed of rotation of the first motor output shaft.

17. An electrical motor position controller comprising:

a first bidirectional electrical motor having a rotor, a rotor brake disc and a starter, the rotor rotatably driving a motor output shaft;

pulse generator means, mounted on the first motor, for generating a series of pulses indicative of the degrees of rotation of the first motor output shaft;

first motor starter means for supplying electrical power to the first motor; and control means, having memory storing a control program and responsive to the pulse generator means and the control program, for energizing the first motor starter means to supply electrical power to the first motor to rotate the output shaft of the first motor in a predetermined programmed direction and for a predetermined programmed number of degrees of rotation according to a program sequence;

the pulse generator means generating first and second, phase offset pulse trains upon rotation of the rotor;

a notch formed on a peripheral edge of the rotor brake disc;

means, mounted in the first motor, for sensing the passage of the notch therepast as the rotor rotates, the sensing means generating an output signal for each passage of the notch therepast; and pulse signal conditioner means, receiving the first and second pulse trains from the pulse generator means and the output signal from the sensing means, for generating a first set of signals corresponding to normal first and second pulse trains and the output from the sensing means and a second set of signals corresponding to inverted first and second pulse trains and an inverted output from the sensing means.

* * * * *